United States Patent Office 3,400,146
Patented Sept. 3, 1968

3,400,146
DI(N-METHYLCARBAMATES) OF FLUORO-
KETONE DERIVATIVES
Everett E. Gilbert, Morris Township, Morris County, and Julian A. Otto, Stockholm, N.J., assignors to Allied Chemical Corporation, New York, N.Y., a corporation of New York
No Drawing. Filed May 5, 1964, Ser. No. 365,149
4 Claims. (Cl. 260—479)

This invention relates to di(N-methylcarbamates) of fluoroketone derivatives useful as active pesticidal toxicants.

One object of the present invention is to provide new di(N-methylcarbamates) of fluoroketone derivatives.

A further object of this invention is the provision of di(N-methylcarbamates) of fluoroketone dirivatives for use as active pesticidal toxicants.

Other objects and advantages of the invention will be apparent from the following description.

The new di(N-methylcarbamates) of fluoroketone derivatives may be represented by the following general formula:

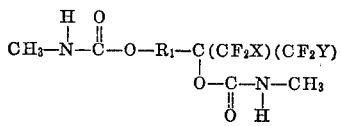

wherein $R_1$ is an aryl radical which is connected to the adjacent carbon atom by one of an ortho- and para-position and X and Y are members selected from the group consisting of fluorine and chlorine. The aryl radical is preferably a member selected from the group consisting of phenyl, naphthal, alkyl-substituted phenyl, cycloalkyl-substituted phenyl, alkylmercapto-substituted phenyl, halo-substituted phenyl and aryl-substituted phenyl. The aryl radical may also be derived from resorcinol, 1,5-naphthalenediol and Bisphenol-A (p,p-isopropyllidenediphenol).

The di(N-methylcarbamates) of fluoroketone derivatives may be prepared by reacting a fluoroketone derivative having the following general formula:

R—C(OH)(CF$_2$X)(CF$_2$Y)

wherein R is a nuclearly hydroxy-substituted aryl radical which is connected to the adjacent carbon atom by one of an ortho-and para-linkage and X and Y are members selected from the group consisting of fluorine and chlorine with methyl isocyanate, in mol ratio of at least about 2 mols of methyl isocyanate per mol of fluoroketone derivative, in accordance with the methods described in Agricultural and Food Chemistry, vol. 2 (1954), page 865 and Journal of Economic Entomology, vol. 53 (1960), page 828. The reaction is represented by the following equation:

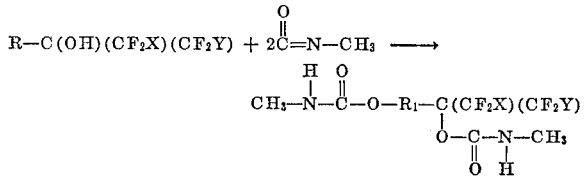

wherein R, $R_1$, X and Y have the meanings given above.

The reactants are generally employed in ratio of about 2.2 to 3 mols of methyl isocyanate per mol of fluoroketone derivative. The reatcion may be carried out at temperature of about 0° to 100° C. for a period of about 1 to 75 hours. Atmospheric or superatmospheric pressure may be used. If desired, the reaction may be conducted in the presence of an anhydrous inert solvent such as isopropyl ether, acetone, or ethyl ether. The reaction may be aided by addition of about 0.5 to 1% by weight (based on the fluorokteone derivative) of a tertiary amine catalyst such as triethylamine.

The fluoroketone derivatives which are employed as starting materials are described in co-pending U.S. application Ser. No. 327,520 of Everett E. Gilbert et al., filed Dec. 2, 1963 now U.S. Patent 3,324,185. These derivatives are readily prepared by reacting a nuclearly hydroxy-substituted aromatic compound having the general formula:

ROH wherein R is an aryl radical having at least one of a free ortho- and a free para-position with a hexahaloacetone compound having the general formula:

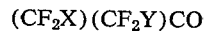

(CF$_2$X)(CF$_2$Y)CO wherein X and Y are members selected from the group consisting of fluorine and chlorine under non-catalytic conditions or in the presence of a sulfonic acid catalyst.

The hexahaloacetone compounds which may be utilized in preparing the starting materials include hexafluoroacteone, sym-tetrafluorodichloroacetone and pentafluoromonochloroacetone.

The nuclearly hydroxy-substituted aromatic compounds which are employed in preparing the fluoroketone derivatives are preferably compounds selected from the group consisting of phenol, naphthol, and alkyl-substituted, cycloalkyl-substituted, alkylmercapto-substituted, halo-substituted and aryl-substituted phenols containing at least one of a free ortho-and free para-position. The alkyl groups of these compounds preferably contain from 1 to 9 carbon atoms. Typical examples of these compounds are phenol, 1-naphthal, 4-cresol, 2,6-dimethylphenol, 2,6-di-tert.-butylphenol, 3-cresol, 2-cresol, 2-tert.-butylphenol, 4-cyclohexylphenol, 2-isopropylphenol, 3-isopropylphenol, 4-isopropylphenol, 2,6-diisopropylphenol, 2-methyl-6-tert.-butylphenol, 4-nonylphenol, 2-cyclohexylphenol, 2-phenylphenol, 4-phenylphenol, 4-methylmercaptophenol, 2-chlorophenol, 4-chlorophenol. Other suitable compounds include resorcinol, 1,5-naphthalenediol and Bisphenol-A (p,p-isopropyllidenediphenol).

Typical of the fluoroketone derivatives employed as starting materials are:

2-(1,1,3,3-tetrafluoro-1,3-dichloro-2-hydroxy-2-propyl) phenol
6-(1,1,3,3-tetrafluoro-1,3-dichloro-2-hydroxy-2-propyl)-2-methylphenol
6-(1,1,3,3-tetrafluoro-1,3-dichloro-2-hydroxy-2-propyl)-3-methylphenol
6-(1,1,3,3-tetrafluoro-1,3-dichloro-2-hydroxy-2-propyl)-4-methylphenol
6-(1,1,3,3-tetrafluoro-1,3-dichloro-2-hydroxy-2-propyl)-2-chlorophenol
2-(1,1,3,3-tetrafluoro-1,3-dichloro-2-hydroxy-2-propyl)-3-isopropylphenol
2-(1,1,3,3-tetrafluoro-1,3-dichloro-2-hydroxy-2-propyl)-1-naphthol
2-(1,1,3,3-tetrafluoro-1,3-dichloro-2-hydroxy-2-propyl)-4-phenylphenol
2-(1,1,3,3-tetrafluoro-1,3-dichloro-2-hydroxy-2-propyl)-4-cyclohexylphenol
2-(1,1,3,3-tetrafluoro-1,3-dichloro-2-hydroxy-2-propyl)-4-nonylphenol
4-(1,1,3,3-tetrafluoro-1,3-dichloro-2-hydroxy-2-propyl)-2,6-diisopropylphenol
6-(1,1,3,3-tetrafluoro-1,3-dichloro-2-hydroxy-2-propyl)-2-isopropylphenol
6-(1,1,3,3-tetrafluoro-1,3-dichloro-2-hydroxy-2-propyl)-2-tert.-butylphenol
6-(1,1,3,3-tetrafluoro-1,3-dichloro-2-hydroxy-2-propyl)-4-isopropylphenol 4-(1,1,3,3-tetrafluoro-1,3-dichloro-2-hydroxy-2-propyl)-2-methyl-6-tert.-butylphenol
2-(1,1,3,3-tetrafluoro-1,3-dichloro-2-hydroxy-2-propyl)-1,5-naphthalenediol
4-(1,1,3,3-tetrafluoro-1,3-dichloro-2-hydroxy-2-propyl)-2,6-dimethylphenol
6-(1,1,3,3-tetrafluoro-1,3-dichloro-2-hydroxy-2-propyl)-2-cyclohexylphenol
2-(hexafluoro-2-hydroxy-2-propyl)-3-methylphenol
6-(hexafluoro-2-hydroxy-2-propyl)-2-methylphenol
2-(hexafluoro-2-hydroxy-2-propyl)-4-methylphenol
6-(hexafluoro-2-hydroxy-2-propyl)-2-tert.-butylphenol
2-(hexafluoro-2-hydroxy-2-propyl)-2,6-dimethylphenol
4-(hexafluoro-2-hydroxy-2-propyl)-1-naphthol
2-(1,1,1,3,3-pentafluoro-3-chloro-2-hydroxy-2-propyl)-3-methylphenol The di(N-methylcarbamates) of fluoroketone derivatives of this invention are insoluble in water, but soluble in organic solvents such as isopropyl ether, acetone, benzene and other aromatic solvents.

The following examples, in which parts are by weight, are given for the purpose of illustrating methods of producing the di(N-methylcarbamates) of fluoroketone derivatives.

Example 1

29.3 parts of 2-(1,1,3,3-tetrafluoro-1,3-dichloro-2-hydroxy-2-propyl)phenol and 12 parts of methyl isocyanate were placed in a pressure vessel with about 36 parts of isopropyl ether as solvent and 5 drops of triethylamine as catalyst. The reaction mixture was heated on a steam bath at temperature of about 95° C. for about 24 hours. The reaction mixture was then removed, and the solvent and any unreacted methyl isocyanate were distilled off. 41 parts of a liquid product comprising the di(N-methylcarbamate) of 2-(1,1,3,3-tetrafluoro-1,3-dichloro-2-hydroxy-2-propyl)phenol, represented by the following formula, were obtained:

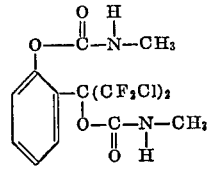

The product showed the following elemental analysis—
Theoretical: fluorine, 18.7%; hydrogen, 3.0%; nitrogen, 5.9%. Found: fluorine, 18.8%; hydrogen, 3.4%; nitrogen, 6.3%.

Example 2

6-(1,1,3,3-tetrafluoro-1,3-dichloro-2-hydroxy-2-propyl)-2-methylphenol was reacted with methyl isocyanate in accordance with the procedure described in Example 1. A theoretical yield of a solid product comprising the di(N-methylcarbamate) of 6-(1,1,3,3-tetrafluoro-1,3-dichloro-2-hydroxy-2-propyl)-2-methylphenol, represented by the following formula, was obtained:

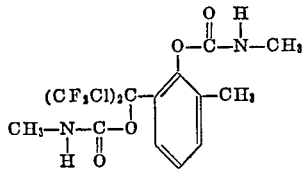

The product showed the following elemental analysis—
Theoretical: fluorine, 18.1%; hydrogen, 3.3%; nitrogen, 6.7%. Found: fluorine, 18.7%; hydrogen, 3.8%; nitrogen, 6.4%.

Following the procedure given in Example 1, except using acetone as solvent and reducing the heating time to 7 hours, products comprising di(N-methylcarbamates) of the following fluoroketone derivatives were prepared:

Example:    Fluoroketone derivatives
3____6-(1,1,3,3-tetrafluoro-1,3-dichloro-2-hydroxy-2-propyl)-3-methylphenol.
4____6-(1,1,3,3-tetrafluoro-1,3-dichloro-2-hydroxy-2-propyl)-4-methylphenol.
5____6-(1,1,3,3-tetrafluoro-1,3-dichloro-2-hydroxy-2-propyl)-2-chlorophenol.
6____2-(1,1,3,3-tetrafluoro-1,3-dichloro-2-hydroxy-2-propyl)-3-isopropylphenol.
7____2-(1,1,3,3-tetrafluoro-1,3-dichloro-2-hydroxy-2-propyl)-1-naphthol.
8____2-(1,1,3,3-tetrafluoro-1,3-dichloro-2-hydroxy-2-propyl)-4-phenylphenol.
9____2-(1,1,3,3-tetrafluoro-1,3-dichloro-2-hydroxy-2-propyl)-4-cyclohexylphenol.
10____2-(1,1,3,3-tetrafluoro-1,3-dichloro-2-hydroxy-2-propyl)-4-nonylphenol.
11____4-(1,1,3,3-tetrafluoro-1,3-dichloro-2-hydroxy-2-propyl)-2,6-diisopropylphenol.
12____6-(1,1,3,3-tetrafluoro-1,3-dichloro-2-hydroxy-2-propyl)-2-isopropylphenol.
13____6-(1,1,3,3-tetrafluoro-1,3-dichloro-2-hydroxy-2-propyl)-2-tert.-butylphenol.
14____6-(1,1,3,3-tetrafluoro-1,3-dichloro-2-hydroxy-2-propyl)-4-isopropylphenol.
15____4-(1,1,3,3-tetrafluoro-1,3-dichloro-2-hydroxy-2-propyl)-2-methyl-6-tert.-butylphenol.
16____2-(1,1,3,3-tetrafluoro-1,3-dichloro-2-hydroxy-2-propyl)-1,5-naphthalenediol.
17____4-(1,1,3,3-tetrafluoro-1,3-dichloro-2-hydroxy-2-propyl)-2,6-dimethylphenol.
18____6-(1,1,3,3-tetrafluoro-1,3-dichloro-2-hydroxy-2-propyl)-2-cyclohexylphenol.
19____2-(hexafluoro-2-hydroxy-2-propyl)-3-methylphenol.
20____6-(hexafluoro-2-hydroxy-2-propyl)-2-methylphenol.
21____2-(hexafluoro-2-hydroxy-2-propyl)-4-methylphenol.
22____6-(hexafluoro-2-hydroxy-2-propyl)-2-tert.-butylphenol.
23____2-(hexafluoro-2-hydroxy-2-propyl)-2,6-dimethylphenol.

Infrared curves run on representative products (Examples 1–5, 7, 12, 13, 15 and 16) all showed similar patterns with the expected peaks for NH at 3300 cm.$^{-1}$, for CO at 1790 cm.$^{-1}$ and for CONH at 1680 cm.$^{-1}$.

The compounds of this invention may be employed as active pesticidal toxicants, and particularly as insecticides, miticides and herbicides. The compounds can be employed either as the sole toxicant ingredients, or they can be employed in conjunction with other pesticidally active materials, such as DDT, benzene hexachloride, etc.

The compounds are ordinarily applied as toxicants for combatting insects and mites in conjunction with a carrier which may be an inert solid, liquid or gaseous material, or a bait.

When employed in the form of a powder, fine or granular dust for killing insects and mites, the toxicant may be mixed with a substantial proportion of any suitable inert material or diluent, such as known grades of prepared parasiticide carrier clays, pyrophyllite, fuller's earth, bentonite, sulfur, lime, talc, whiting, diatomaceous earth, etc. Suitable dusts of this type usually contain not less than 0.5%, and preferably not less than 1% of toxicant.

Liquid insecticide or miticide sprays containing the toxicant may be prepared by first forming a solution of the compound in a suitable organic solvent, e.g. xylene, toluene or benzene, and adding a small amount of emulsifying agent commonly employed in the art, such as diglycol oleate or p-isooctyl phenyl ether of polyethylene glycol. The resulting concentrate solution may be diluted with a non-phytotoxic oil, or incorporated with water, in amount sufficient to form an aqueous spray dispersion or emulsion having the desired active ingredient concentration.

In a preferred embodiment, aqueous spray dispersions or suspensions may be formed by incorporating in water so-called dry wettable spray powders or water-dispersible pastes containing the compounds of the invention. These mixtures may also include inert diluents, suitable quantities of wetting, dispersing and suspending agents and, if desired, secondary toxicants.

The aqueous spray dispersions of the invention preferably should contain the toxicant in an amount not less than ⅛ pound per hundred gallons of spray, the more usual amount being in the range of ½ to 2 pounds per hundred gallons of spray.

When used in controlling plant insects or mites, the toxicant is used in minimum amount in order to avoid injury to the plant host.

The following table shows the results of tests on application of typical compounds of this invention to insects and mites. The tests were carried out using 8 pounds or ½ pound of a 25% wettable powder composition per hundred gallons of water. The wettable powder compositions comprised 25% toxicant, 73.5% "Attaclay" (attapulgite clay carrier), 0.75% "Nacconol SW" (sodium alkyl aryl sulfonate wetting agent), and 0.75% "Elvanol 5105" (polyvinyl alcohol dispersing agent).

TABLE 1

| Compound | Formulation | Two-spotted mites, percent kill | Southern army-worm larvae, percent kill | Pea aphids, percent kill |
|---|---|---|---|---|
| Example 10 | (1) | 100 | | 63 |
| Example 12 | (1) | 100 | 100 | |
| Example 13 | (1) | 100 | | |
| Example 7 | (2) | 89.6 | | |

[1] 8 lbs. of 25% wettable powder composition per 100 gals. water.
[2] ½ lb. of 25% wettable powder composition per 100 gals. water.

The tests on toxicity to mites were carried out on two-spotted mites (*Tetranychus telarius*) by spraying the indicated formulation onto horticultural (cranberry) bean plants infested with the mites. Following treatment, the plants were stored on racks in irrigated trays under greenhouse conditions. Mortality counts were made three days after treatment.

The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made three days after treatment.

The tests on toxicity to southern armyworm larvae (*Prodenia eridania*) were run by spraying horticultural (cranberry) bean plants with the indicated formulation and allowing the plants to dry. The larvae were confined to the treated foliage by means of wire cages. Record of kill was made three days after treatment.

The compounds of this invention are also useful as herbicidal toxicants, particularly in the post-emergent treatment of oil containing noxious broadleaf and grassy weeds.

The toxicants are preferably incorporated in liquid or solid diluents. Compositions similar to the insecticidal and miticidal compositions described above may be employed for herbicidal purposes. Phytotoxic oils, as well as water, may be used as carriers.

The toxicants are applied to the area to be treated in amount (pounds per acre) sufficient to afford the desired control of vegetation. The optimum intensity of application will depend on such factors as amount of vegetation in the area, degree of permanency of plant eradication desired, type of plants growing in the area and climatic conditions. Hence, as is well known to those skilled in the art, the rate of application actually used will depend largely on prevailing local conditions. In most instances, effective control of germinating weed seeds and small weed seedlings may be realized by applying the toxicant at an over-all rate greater than about 4 pounds per acre. Where prolonged control of established vegetation is desired, dosages greater than about 16 pounds per acre are employed.

The following example is illustrative of the post-emergent herbicidal activity of the compounds of the present invention.

A test plot was covered with rape and ryegrass plants. Each compound was applied by spraying to a designated section of the test plot at the rate of 16 pounds in 40 gallons of acetone per acre, as described by Shaw and Swanson in "Weeds," vol. 1, No. 4, pp. 352–365 (July 1952). The following results were obtained several days after treatment.

| Compound | Injury rating [1] | |
|---|---|---|
| | Rape | Ryegrass |
| Example 1 | 10 | 3 |
| Example 2 | 10 | 4 |
| Example 3 | 10 | 5 |
| Example 4 | 10 | 3 |
| Example 5 | 10 | 6 |

[1] Injury rating: 0=none, 1-3=slight, 4-6=moderate, 7-9=severe, 10=killed.

Since various modifications may be made without departing from the spirit thereof, the invention is to be taken as limited only by the scope of the appended claims.

We claim:

1. A di(N-methylcarbamate) of a fluoroketone derivative having the general formula:

$$CH_3-N-C-O-R_1-C(CF_2X)(CF_2Y) \atop \phantom{CH_3-N-C-O-R_1-}O-C-N-CH_3$$

wherein $R_1$ is an aryl radical selected from the group consisting of phenyl, naphthyl and alkyl-substituted, cycloalkyl-substituted, alkylmercapto-substituted, halo-substituted and phenyl-substituted phenyl radicals which is connected to the adjacent carbon atom by one of an ortho- and para-position and X and Y are members of the group consisting of fluorine and chlorine.

2. A compound defined by claim 1 wherein X and Y are fluorine.

3. A compound defined by claim 1 wherein X and Y are chlorine.

4. The compound having the formula:

$$(CF_2Cl)_2C-\text{phenyl}-CH(CH_3)_2$$

with carbamate substituents $O-C(=O)-N(H)-CH_3$ at ortho and $CH_3-N(H)-C(=O)-O$ positions.

References Cited

UNITED STATES PATENTS

| 3,040,089 | 6/1962 | Kulka | 260—482 |
| 3,051,744 | 8/1962 | Bowers | 260—482 |
| 3,006,808 | 10/1961 | Ramey et al. | 167—30 |
| 3,044,927 | 7/1962 | Heininger et al. | 167—30 |

LORRAINE A. WEINBERGER, *Primary Examiner.*

M. G. BERGER, *Assistant Examiner.*